United States Patent [19]

Ricks et al.

[11] 3,999,059
[45] Dec. 21, 1976

[54] SHOCK ABSORBING HOLD-DOWN LATCH

[75] Inventors: Earl C. Ricks; Wiley B. Vickers, both of Huntsville, Ala.

[73] Assignee: The United States of America as represented by the Secretary of the Army, Washington, D.C.

[22] Filed: Apr. 30, 1975

[21] Appl. No.: 573,287

[52] U.S. Cl. ............................... 248/510; 105/367; 105/464; 211/13; 280/179 R; 308/24
[51] Int. Cl.² ..................... B60P 7/12; B61D 45/00; B65J 1/24; F16C 35/02
[58] Field of Search .......... 105/367, 463, 464, 465; 211/13; 220/326, 201, 324; 248/509, 510, 8, 18, 20, 119 R; 280/179 A, 179 R, 179 B; 308/24; 24/230 AP, 230 AV, 241 P, 243 G, 248 A; 214/10.5 R; 267/164; 292/20, 341.2

[56] References Cited

UNITED STATES PATENTS

| | | | |
|---|---|---|---|
| 1,502,218 | 7/1924 | VanHook | 308/24 |
| 2,117,142 | 5/1938 | Brown | 308/24 |
| 3,084,803 | 4/1963 | Bayers | 211/13 |
| 3,225,706 | 12/1965 | Bogar et al. | 105/367 |
| 3,392,682 | 7/1968 | Francis | 105/367 |

Primary Examiner—Robert J. Spar
Assistant Examiner—Howard Beltran
Attorney, Agent, or Firm—Nathan Edelberg; Robert P. Gibson; Harold W. Hilton

[57] ABSTRACT

A hold-down latch having an overcenter pivot arm which is spring biased in operative position. The latch includes a spring for engagement with a lug on the device to be held down. The latch functions as a shock absorber against vertical movement or vibrations while allowing longitudinal movement of the hold-down device.

3 Claims, 4 Drawing Figures

SHOCK ABSORBING HOLD-DOWN LATCH

DEDICATORY CLAUSE

The invention described herein may be manufactured, used, and licensed by or for the Government for governmental purposes without the payment to us of any royalties thereon.

BACKGROUND OF THE INVENTION

A number of conditions must be satisfied when transporting missiles in a combat situation. They must be protected from damage by some overwrap or container/cannister. The container must also be constrained to prevent excessive shock loads or loss of cargo when traversing rough terrain.

In securing a missile/container to a vehicle it must be loaded or/and unloaded in the shortest possible time which requires quick release mechanisms. Because of the twisting motion of practically every vehicle bed such hold down devices must prevent the missile/container from receiving torque or longitudinal loads that could cause a structural failure.

SUMMARY OF THE INVENTION

A hold-down latch for snug engagement with a device to be held down, such as a missile carrying container, while functioning as a shock absorber against vertical movement or vibrations while allowing longitudinal movement of the held-down missile. The latch of the present invention secures a missile carrying container to the bed of a vehicle for transportation of the missile to a desired location. The latch includes an upstanding bifurcated portion having a solid forwardly extending povot arm disposed in normal relation to the bifurcated portion. A spring is secured to the forwardly extending arm and is curved under the arm with the distal end of the spring pointing to the bifurcated portion of the latch. The spring is disposed for engagement with a lug secured to the missile container on each side thereof. The spring exerts a downward force on the lug in its engaged position. The bifurcated portion of the latch includes two closed end slotted holes, one in each of the bifurcations and two open end slotted holes, one in each bifurcation. A latch rack, rigidly secured to the vehicle, extends upwardly therefrom in the slot between the bifurcations, and is provided with openings in registry with the slotted holes of the latch. A pin is pressed in the openings in the latch rack through the slotted openings in the latch after the latch and latch rack are mated together. Spring pressure keeps the latch locked and aids in releasing the latch.

DESCRIPTION OF THE PREFERRED EMBODIMENT

Figure 1:
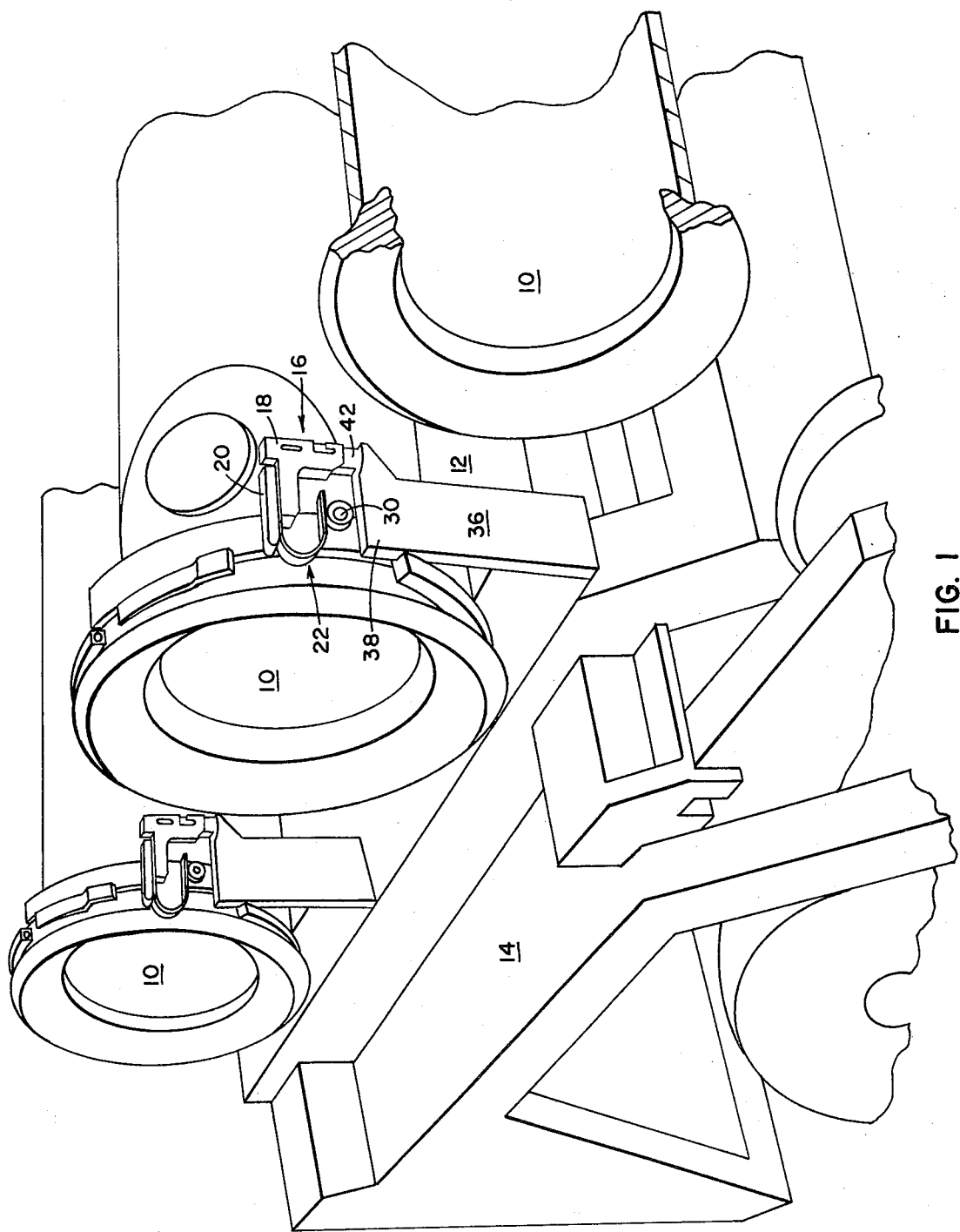
FIG. 1 is a partially pictorial view of the hold-down latch of the present invention securing down a plurality of missile containers on the bed of a truck.

As seen in FIG. 1 a plurality of missile containers 10 is secured to the bed 12 of a vehicle 14 by the hold-down latch assembly 16 of the present invention. A latch assembly 16 is disposed on each side of the missile containers for securing the containers to the bed of the vehicle.

Figure 2:
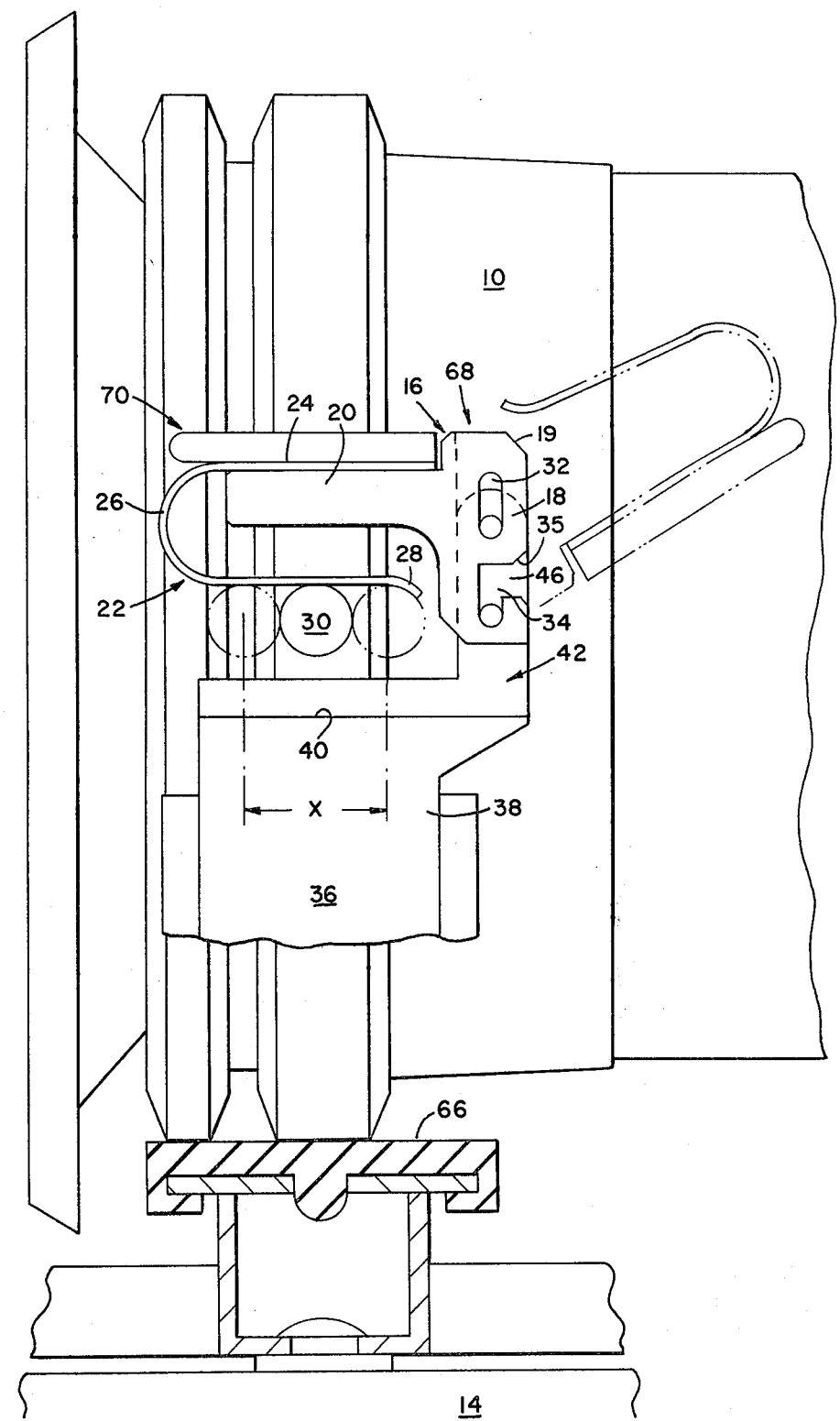
FIG. 2 is an elevational view of the hold-down latch and missile container of FIG. 1.
Figure 4:
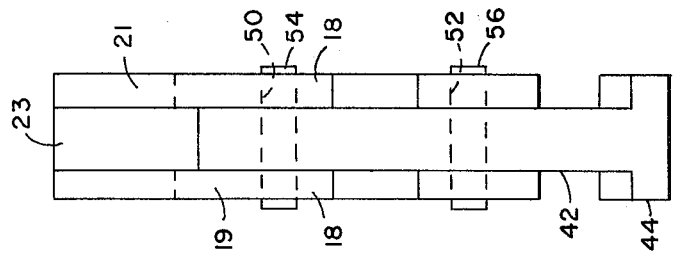
FIG. 4 is an elevational view along line 4—4 of FIG. 3.
Figure 3:
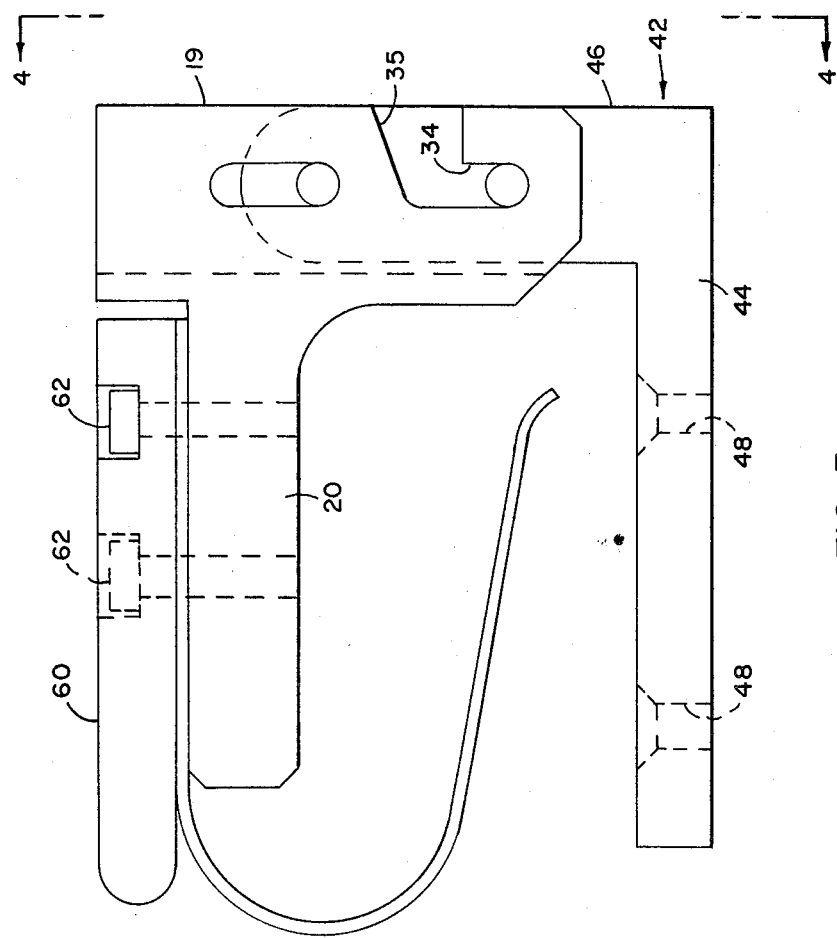
FIG. 3 is an elevational view of the latch and latch rack assembly.

As more clearly shown in FIG. 2, latch assembly 16 includes an upstanding bifurcated portion 18 and a solid forwardly extending pivot arm 20 which extends in normal relation to the bifurcated portion 18. Bifurcated portion 18 forms a pair of legs 19 and 21 with a slot 23 (FIG. 4) therebetween. A spring 22 (FIG. 2) includes a horizontally extending portion 24 which extends along pivot arm 20, a curved portion 26 and a rearwardly extending portion which curves under the pivot arm 20 and a free end 28 which is pointed in the direction of the bifurcated portion and is curved slightly downward away from the pivot arm 20. Spring 22 engages a lug 30 carried on each side of missile container 10. Each arm of the bifurcated body portion 18 includes a closed end slotted hole 32 and an open end slotted hole 34 positioned beneath slotted hole 32. To define the open end slotted hole 34, bifurcated body 18 includes a passage 35 extending from the opening to the outside of the body 18. A latch rack 36 rigidly secured to the vehicle, includes an upwardly extending portion 38 having a flat horizontal surface 40 to which a bracket 42 is secured. As seen in FIGS. 3 and 4 bracket 42 includes a flat horizontal section 44 and an upwardly extending arm 46. Section 44 includes openings 48 to receive a pair of screws for securing the bracket to the surface 40 of the latch rack 36 (FIG. 2). The arm 46 extends upwardly through the bifurcation of bifurcated portion 18 and is provided with an upper opening 50 (FIG. 4) and a lower opening 52 therethrough. A first pin 54 is pressed in the upper opening and extends through the closed end slotted openings 32 of the bifurcated portion 18 to pivotally secure the bracket and latch together. A second pin 56 is pressed in the lower opening and extends through the open end slotted openings 34 in the bifurcated portion.

To secure the spring to pivot arm 20 a spring retainer 60 (FIG. 3) is placed on the horizontal portion 24 of spring 22 and is secured to pivot arm 20 by screws 62, thus securing the horizontal portion 24 between retainer 60 and pivot arm 20.

As shown in FIG. 2 a small movement along the longitudinal axis of the missile, denoted by the letter X, is allowed to compensate for flexure of the vehicle bed. A strap 64 (FIG. 1) limits the movement to the desired limit. Additionally, a rubber cushion pad 66 (FIG. 2) cooperates with spring 22 to function as a shock absorber against vertical movement or vibrations.

In operation, the bracket 42 is secured to latch rack 36 and the bracket and latch are mated. Pins 54 and 56 are directed through the slotted openings and pressed into openings 50 and 52, respectively, of arm 46. Once assembled, the hold-down latch may be released to the position shown in phantom lines (FIG. 2) by exerting a downward pressure along the line designated by the numeral 68. To lock the latch it is only necessary to exert a downward pressure along the line designated by the numeral 70.

We claim:

1. A bifurcated latch for releasably securing a member against a platform having a longitudinal axis, said latch disposed as a shock absorber against vertical movement and forming a transverse slot which provides limited movement transversely to said longitudinal axis of said platform, comprising:

a. a body having an upstanding bifurcated portion and a pivot arm portion pivotally mounted in substantially normal relation to said bifurcated portion, said bifurcated portion forming a pair of upstanding parallel legs having a slot therebetween;

b. a support member secured to said platform and extending upwardly into said slot between said legs;

c. means pivotally securing said body to said upstanding member; and, d. means for biased engagement with said member including a U-shaped spring secured to said pivot arm and extending thereunder for the biased engagement with said member, the spring force of said U-shaped spring disposed for limiting the said movement of said member.

2. A latch as in claim 1 wherein said means for pivotally securing said body includes a pair of pins extending from said support member, and each of said legs having an elongated closed end slotted opening to receive a first of said pair of pins therethrough, and a second slot disposed beneath said first slots in each of said legs, said legs having a passage communicating from the outside thereof into said second slots, said second slots disposed to receive the second of said pair of pins therethrough.

3. A latch as in claim 2 wherein said spring includes a first horizontally extending portion for secured relation with said pivot arm, a curved central portion, and a second horizontally extending portion which extends under said pivot arm and is provided with a free end directed toward said bifurcated portion of said latch.

* * * * *